(12) United States Patent
Legner

(10) Patent No.: US 7,201,702 B2
(45) Date of Patent: Apr. 10, 2007

(54) DRIVE MECHANISM FOR A MOBILE VEHICLE

(75) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 162 days.

(21) Appl. No.: 10/909,459

(22) Filed: Aug. 2, 2004

(65) Prior Publication Data

US 2006/0021464 A1  Feb. 2, 2006

(51) Int. Cl.
*F16H 61/38* (2006.01)
(52) U.S. Cl. ........................................... 477/52
(58) Field of Classification Search ............. 74/665 R, 74/661, 664, 733.1, 730.1, 731.1, 732.1; 475/75, 72, 83
See application file for complete search history.

(56) References Cited

U.S. PATENT DOCUMENTS

| | | | | |
|---|---|---|---|---|
| 3,465,616 A | * | 9/1969 | Schou | 477/69 |
| 3,990,327 A | * | 11/1976 | Margolin | 475/80 |
| 4,069,886 A | | 1/1978 | Campbell et al. | |
| 4,354,400 A | * | 10/1982 | Baker | 475/74 |
| 4,653,271 A | | 3/1987 | Reeves et al. | |
| 5,159,992 A | | 11/1992 | Reinecke et al. | |
| 5,388,450 A | | 2/1995 | Hurth | |
| 5,394,771 A | * | 3/1995 | Schroder | 74/661 |
| 5,617,764 A | * | 4/1997 | Komura et al. | 74/606 R |
| 5,766,107 A | * | 6/1998 | Englisch | 475/80 |
| 5,848,565 A | | 12/1998 | Thoma | |
| 6,145,312 A | | 11/2000 | Hauser et al. | |
| 6,367,572 B1 | | 4/2002 | Maletschek et al. | |
| 6,508,328 B1 | | 1/2003 | Kenyon | |
| 6,622,594 B2 | * | 9/2003 | Ikari et al. | 74/733.1 |
| 6,675,576 B2 | | 1/2004 | Bigo et al. | |
| 6,849,028 B2 | * | 2/2005 | Nakatani et al. | 477/52 |
| 7,070,531 B2 | * | 7/2006 | Ishizaki | 475/75 |
| 7,082,760 B2 | * | 8/2006 | Legner et al. | 60/484 |

FOREIGN PATENT DOCUMENTS

| | | |
|---|---|---|
| DE | 1 132 450 | 1/1963 |
| DE | 1 901 959 | 10/1977 |
| DE | 39 07 633 A1 | 9/1990 |
| DE | 37 44 215 C2 | 5/1991 |
| DE | 196 24 534 A1 | 1/1998 |
| DE | 198 27 130 A1 | 12/1999 |
| DE | 100 34 752 A1 | 8/2002 |
| EP | 0 483 543 A1 | 5/1992 |
| GB | 1 288 508 | 9/1972 |
| JP | 11230307 | 8/1999 |
| WO | WO-99/17021 | 4/1999 |

* cited by examiner

*Primary Examiner*—Ha Ho
*Assistant Examiner*—Justin K. Holmes
(74) *Attorney, Agent, or Firm*—Davis Bujold & Daniels, P.L.L.C.

(57) ABSTRACT

A drive mechanism for a mobile vehicle having two motors, the torque of which is added up on a common output shaft (30), one motor being connectable with the output shaft (30) via a first reduction gear step (28) or a second reduction gear step (29) and at the maximum rotational speed of the output shaft (30), one motor (12) has zero displacement and is separated from a common high-pressure line (2).

20 Claims, 2 Drawing Sheets

DRIVE MECHANISM FOR A MOBILE VEHICLE

FIELD OF THE INVENTION

The invention concerns a drive mechanism for a mobile vehicle.

BACKGROUND OF THE INVENTION

Generic drive mechanisms are specially used for mobile machines such as wheel loaders, graders, or excavators. In wheel loaders, particularly wheel loaders greater than 12 tons, the whole driving range is divided in two driving ranges, one working range, preferably up to a speed of about 20 km/h, and one transport range which can extend to a speed of up to about 40 km/h. In the course of the working range it is advantageous if the whole speed range can be achieved without mechanical gear shifts since, through each mechanical gear shift, due to the change of ratio, the time required increases the working time of the wheel loader.

EP 0 483 543 B1 has disclosed a hydrostatic drive mechanism, preferably a ground leveling device, such as a wheel loader, in which a first axial piston hydromotor and a second axial-piston hydromotor are shifted together in one summarizing gear in a manner such that in a starting gear the torques of both hydromotors drive the output shaft and, in a final speed, one hydromotor is in idling speed and the other hydromotor alone drives the input shaft. Between the starting and the final speed, several ratio steps are shifted, preferably via synchronizer units. Disengaged at the final speed, the motor is at zero absorption volume and in idling speed, since said motor would otherwise overspeed. The synchronizer units have to synchronize both the drag torque of the gear wheels and the drag torque of the whole axial piston motor with the pistons and cylinders thereof. Since the motor is also pressurized at zero absorption volume, the bearings of the output shaft of the hydromotor undergo considerable axial forces which increase the synchronizing torque. To achieve a final speed of almost 40 km/h, the drive mechanism needs two hydromotors and at least two shift devices whereby a gear shift cannot be prevented in the working range.

The problem on which the instant invention is based is to provide a drive mechanism for a mobile vehicle, specially of a mobile machine such as a wheel loader, which stands out by simple construction of the reduction gear, the same as by as few as possible gear shifts in the working range.

SUMMARY OF THE INVENTION

According to the invention a first hydromotor of adjustable displacement drives a first reduction gear part and a second hydromotor of adjustable displacement drives a second reduction gear part, the torques of both reduction gear parts being concentrated in one summarizing transmission which drives the output shaft of the transmission. A reduction gear part is preferably made shiftable so that one hydromotor be connected with the summarizing transmission via a first reduction gear and also can be shifted to a second reduction speed. The shift device, which shifts between both ratios, is preferably designed as a mechanical synchronizer unit, preferably having only two shifting positions. In a first shifting position, the hydromotor is connected with the output shaft via the first ratio and, in the second shifting position, the first hydromotor is connected with the output shaft via the second ratio. The shift device can also be made as a multi-disc clutch. A mid-position of the shift device, where the hydromotor is completely uncoupled, is not needed, since the hydromotor can remain connected with the output shaft in every driving mode, but this does not rule out a shift device having a mid-position. Connected with the shift device, the hydromotor is preferably designed as radial piston hydromotor, such as in the WO 99/17021, which is entirely comprised here. The displacement adjusting device of this motor is preferably designed hydraulic whereby in the crankshaft pistons are situated which adjust the eccentric of the crankshaft so that the eccentric can be adjusted by a coaxial shaft up to a defined eccenter. These pistons are preferably connected with the high pressure. By virtue of the use of such radial piston hydromotor, which in its zero absorption capacity has a coaxial shaft as crankshaft, the synchronizer device must exclusively synchronize the drag torque of the gear wheels of the reduction gear part and of the shaft of the radial piston hydromotor. The pistons in the cylinders effect almost no lifting motion and do not have to be accelerated by the synchronizer device, since they are stationarily supported in the housing. The radial piston motor is separated from the high pressure preferably at the moment at which the synchronizer device shifts whereby the bearing forces resulting from the pressure load of the pistons are clearly reduced whereby the torque load of the synchronizer unit is additionally reduced. In order to achieve the maximum input torque, both hydromotors are adjusted to the maximum displacement and the shift device is controlled so that the mechanically shiftable hydromotor with the high ratio is connected with the output shaft. At the maximum final speed, that is, the maximum output rotational speed of the output shaft of the transmission, one hydromotor is at its zero displacement and is separated from the high pressure and the other hydromotor is, likewise, connected with the output shaft via the smallest possible ratio and with a minimum displacement. In this driving mode, the hydromotor moved to zero displacement is above its maximum admissible rotational speed with high-pressure loading which is however possible since the hydromotor has been separated from the high pressure and its displacement adjusted to zero. By no high pressure forces acting upon the hydromotor and the hydromotor being moved to zero displacement, the pistons thus exerting almost no stroke in the cylinders, it is possible to operate the hydromotor above its maximum admissible rotational speed. It is thus possible with only one shift device and two hydromotors of adjustable displacement to drive a mobile machine greater than 12 tons in which a final speed of almost 40 km/h can be reached. The ratios and the hydromotors are to be selected so that only at a travel speed of almost 20 km/h the change of ratio via the shift device is necessary whereby the vehicle can be operated in its whole working range without mechanical shifting.

In another embodiment of the invention, the reduction gear parts, the summarizing transmission and the hydromotors are situated in a common housing which, at the same time, constitutes the pressure medium tank for the hydraulic units. Thereby it is no longer needed to surround the hydromotors with a housing impervious to pressure medium, since the leakage of the hydromotors can discharge directly into the pressure medium tank.

By the motors not being situated upon the output shaft, it is possible to place the pressure medium supply for adjustment of the displacement on one side of the crankshaft and connect this with the high pressure. The sealing thus can be situated on a small diameter whereby high rotational speeds are possible even with high pressures.

BRIEF DESCRIPTION OF THE DRAWINGS

The invention will now be described, by way of example, with reference to the accompanying drawings in which.

DETAILED DESCRIPTION OF THE INVENTION

Figure 1:
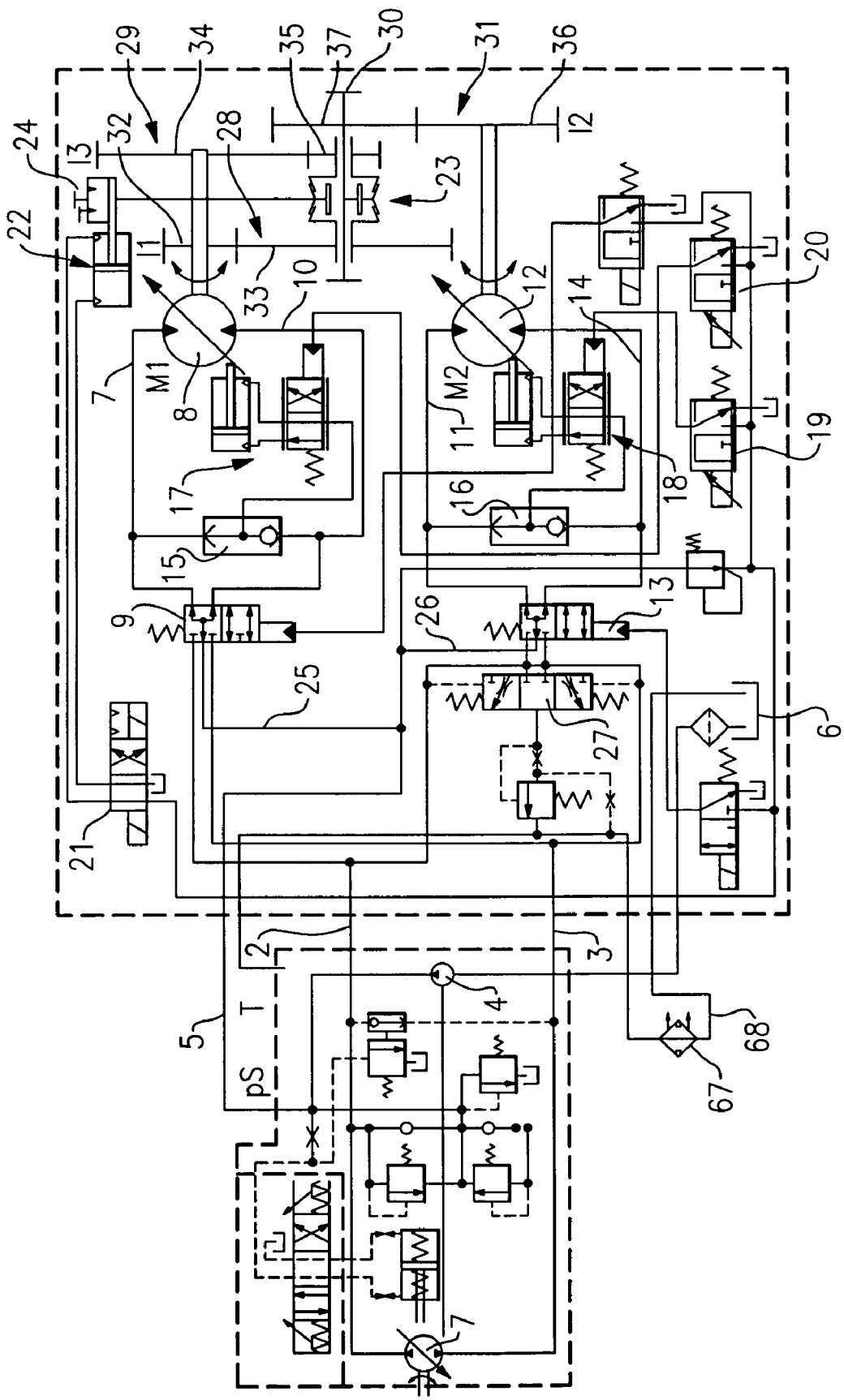
FIG. 1 is a transmission and hydraulics diagram of the inventive design.

FIG. 1;

A prime mover (not shown) drives a pump 1 which conveys pressure medium into a common high-pressure line 2 and sucks it out of a common low-pressure line 3. The pump is preferably designed as an electronic rotational-speed dependent variable displacement pump and is connected with an electronic control unit. One feed pump 4, which is driven by the prime mover, conveys pressure medium into a feeder pressure line 5 and sucks it out of a tank 6 which can be, for example, the transmission housing. A pressure medium supply line 7 of a first motor 8 is connected in a first shift position of a valve 9 with the common high-pressure line 2. A pressure medium return line 10 is connected in a first shift position of the valve 9 with the common low-pressure line 3. Depending on the delivery direction of the pump 1, the common high-pressure line 2 alternates with the common low-pressure line 3 and the pressure medium supply line 7 with the pressure medium return line 10. A pressure medium supply line 11 of a second motor 12 is connected, likewise, in a first shift position of a valve 13, with the common high pressure line 2 and a pressure medium return line 14 is connected in a first shift position of the valve 13 with the common low-pressure line 3. Valves 15 and 16 connect a displacement adjusting device 17 and a displacement adjusting device 18 with the high pressure. The proportional valves 19 and 20 are connected on one side with an electronic control unit and, on the other side, with the displacement adjusting devices 17 and 18 whereby the displacement of the first motor 8 and of the second motor 12 can be regulated. The actuating device 22 of a shift device 23 is controlled via a valve 21 which is, likewise, connected with the electronic control device. The actuating device 22 can preferably be arrested by a detent 24 whereby the shift device 23 remains in its position. If the valve 9 or the valve 13 is moved to its second shift position, the pressure medium supplied 7 and 11, respectively, are separated from the common high-pressure line 2 and the pressure medium return lines 10 and 14 from the common low-pressure line 3 and connected with respective lines 25 and 26 which are connected with the pressure feed line 5. It is also possible to connect the line 25 and the line 26 with the output of a flushing valve 27, but this has the disadvantage that hot oil reaches the valve 9. Thus, in the second shift position of the valve 9, the first motor 8 is loaded exclusively with the supply pressure of the feed pump 4 and, in the second shift position of the valve 13, the second motor 12 is loaded exclusively with the pressure of the feed pump 4. Besides, it is possible to connect the line 25 and the line 26 with a line 68 (lubrication pressure). By the valve 15 being located between the first motor 8 and the valve 9, in the second shift position of the valve 9, the adjusting device 17 is also loaded exclusively with the pressure of the feed pump 4 or the lubrication pressure. The valve 16 is also situated between the valve 13 and the second hydromotor 12 and, in the second shift position of the valve 13 is thus, likewise, loaded only with the pressure of the feed pump 4 or the lubrication pressure. The displacement adjusting device 17 and the displacement adjusting device 18 are thus in the second shift position of the valves 9 and 13, loaded only with the pressure which does not make it possible to enlarge the displacement. By the first motor 8 and the displacement adjusting device 17 being loaded exclusively with the pressure of the feed pump 4, it is possible to operate the motor above its maximum admissible rotational speed in case of high-pressure load. By the second motor 12 and the displacement adjusting device 18 being loaded only with the pressure of the feed pump 4, it is possible to operate the second motor 12 above its maximum admissible rotational speed in case of high-pressure load. By the first motor 8 and the second motor 12 being always loaded either with the high pressure or with the pressure of the feed pump or the lubrication pressure, the pistons are permanently filled with pressure medium whereby the motor, when engaged, does not have to be filled first with pressure medium which could result in a shift jolt. The first motor 8 is connected with a first reduction gear part 28 and a second reduction gear part 29. The first and the second reduction gear parts 28, 29 are connected with the shift device 23 which is connected with an output shaft 30 which constitutes the summarizing transmission. The second motor 12 drives a third reduction gear part 31 which, likewise, is connected with the output shaft 30 which constitutes the summarizing transmission. The first reduction gear part 28 is preferably comprised of one spur gear transmission having one first spur gear 32 and one second spur gear 33 connected with the shift device 23, and the second reduction gear part 29 is comprised of one first spur gear 34 connected with the hydromotor, and one second spur gear 35 connected with the shift device 23. The third reduction gear part 31 is comprised of one first spur gear 36 and one second spur gear 37, the first spur gear 36 being connected with the second motor 12 and the second spur gear 37 with the output shaft 30. The output shaft 30 is preferably connected with the drive axles and drive wheels via a differential transmission.

To achieve the maximum torque in the starting process, the displacement adjusting device 17 and the displacement adjusting device 18 are adjusted so that the first motor 8 and the second motor 12 are at their maximum displacement. The actuating device 22 is shifted so that the shift device 23 connects the hydromotor 8 with the first spur gear 32, the second spur gear 33 and the output shaft 30. If the pump 1 is now swung out, the torque of the first motor 8 and of the second motor 12 are added up by the output shaft 30 and the vehicle is driven. By further swinging out the pump 1, the output rotational speed of the output shaft 30 increases and thus the traveling speed of the vehicle. By further reduction of the displacement of the first motor 8 and of the second motor 12, the rotational speed of the output shaft 30 and thus the output speed are further increased. Preferably at the end of the driving range, at almost 20 km/h, the second motor 12 is at its zero absorption capacity and at its maximum admissible output rotational speed. In this mode, the valve 13 is shifted to its second shift position so that the rotational speed of the second hydromotor 12 can be further increased. In addition, the shift device 23 is switched over via the actuating device 22 so that now the first motor 8 is connected with the output shaft 30 via the second reduction gear part 29. By further reducing the displacement of the first motor 8, the output shaft 30 and thus the traveling speed are further accelerated whereby the rotational speed of the second hydromotor 12 is further increased. But since the second hydromotor 12 is at zero displacement and the valve 13 is in its second shift position, the hydromotor 12 can be operated above its maximum admissible rotational speed. The first motor 8 is now adjusted to a minimum displacement whereby the final speed such as of 40 km/h is reached. The shift device 23 can be made of small dimensions since the shift device 23 has to exclusively synchronize the drag torques of the gear wheels of the first reduction gear part 28 or of the second reduction gear part 29 and the shaft of the first hydromotor 8. The use of radial piston hydromotors, specially internally supported radial piston hydromotors, has the added advantage that the noise of the drive unit is reduced and thus a noise-optimized transmission system results. The noise can be additionally reduced by lowering the input rotational speed of the pump 1.

Figure 2:
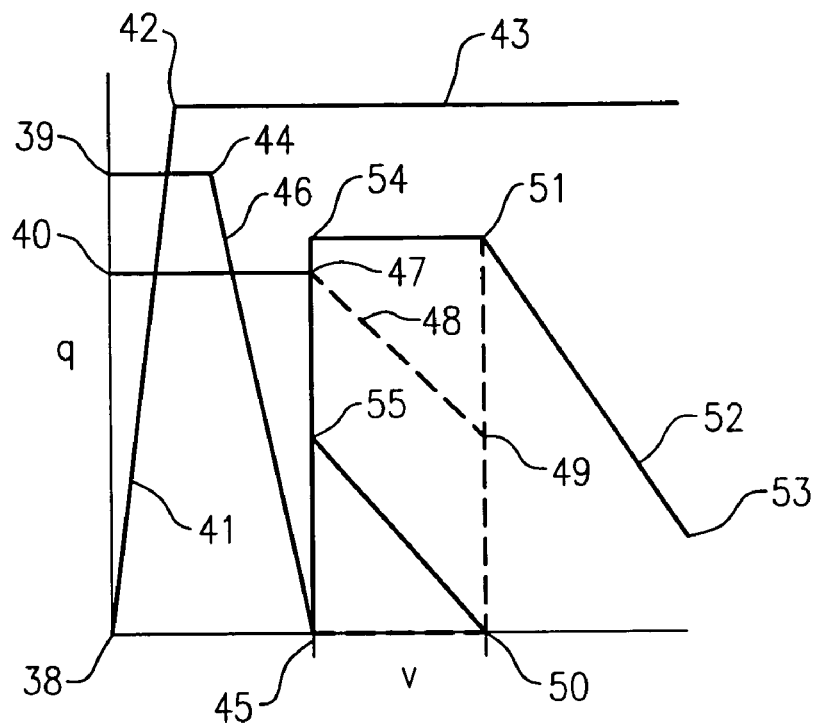
FIG. 2 is a diagram showing the travel speed via the displacement.
Figure 3:
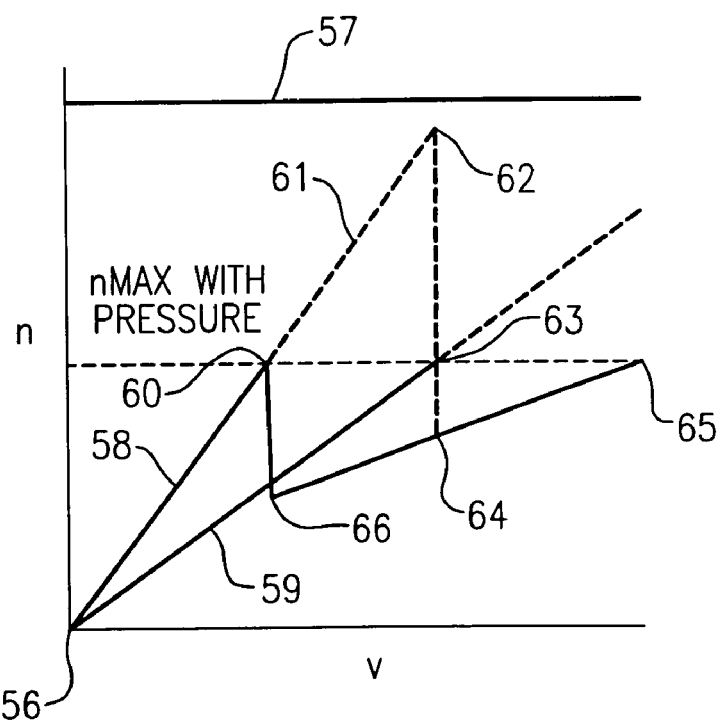
FIG. 3 is a diagram showing the travel speed via the rotational speeds of the motors.

FIG. 2:

Upon the ordinate of the diagram are shown the displacements of the pump 1 of the first motor 8 and of the second motor 12 of FIG. 2. Upon the abscissa is shown the travel speed of the vehicle or the output rotational speed of the output shaft 30. The vehicle stands at an origin 38 thus being at zero speed, the displacement of the pump 1 is likewise at zero, the displacement of the first motor 8 is at its maximum, which is shown with a point 39, and the displacement of the second motor 12 is also at its maximum shown in a point 40. By enlargement of the displacement of the pump 1, the vehicle gains in speed while the output shaft 30 accelerates, as is shown in a line 41. The reduction gear of FIG. 2 is shifted to first gear, the first reduction gear part 28 being connected with the output shaft 30 via the shift device 23. Starting from a point 42, the pump 1 remains at its maximum displacement, which is shown by a line 43. Starting from a point 44, the displacement of the first motor 8 diminishes until reaching its zero displacement at a point 45. The reduction of displacement of the motor 8 is shown in a line 46. At the point 45, the first motor 8 has reached its maximum admissible rotational speed level and is separated from the high pressure via the valve 9. In order to accelerate the vehicle further, starting from a point 47 the displacement of the second motor 12 is reduced whereby the rotational speed of the output shaft increases and the rotational speed of the first hydromotor 8 is accelerated above its maximum admissible rotational speed level. The reduction of the displacement of the second motor 12 is shown in a line 48. At a point 49, the second motor 12 reaches its maximum rotational speed which can correspond, for example, to a vehicle speed of almost 20 km/h and has been first adjusted to zero in displacement and then separated from the high pressure via the valve 13. The second motor 12 is thus at zero displacement at a point 50 and is separated from the high pressure. At the point 50, the first motor 8 is simultaneously reconnected with the high pressure via the valve 9 and adjusted to a correspondingly high displacement, as can be seen at a point 51. Before the first motor 8 is reconnected via the valve 9 with the high pressure and adjusted to the displacement at the point 51, the valve 21 is activated whereby the shift device 23 connects the first motor 8 via the reduction gear part 29 with the output shaft 30 whereby the second gear is engaged. In this gear shift, since the first motor 8 is at zero displacement and separated from the high pressure, the shift device 23 only has to synchronize the drag torques of the spur gears and of the shaft of the hydromotor. When the first hydromotor 8 is again at its high displacement of the point 51, the displacement is again reduced, as shown in a line 52, until the vehicle reaches at a point 53 its final speed of 40 km/h. At this final speed, the second motor 12 is above its admissible rotational speed level. The admissible rotational speed level is defined according to technical and economic principles at which the hydromotor is loaded with the high pressure. It is also possible at the point 45 to complete the shift to the second gear and then to adjust the displacement of the first motor at a point 54, the displacement of the second motor 12 from a point 55 to the point 50 becomes reduced. Within the window formed by the points 47, 49, 55 and 50 a shift of the shift device 23 and the adjustment of displacement associated therewith become possible. When the vehicle is accelerated the shift from the first gear to the second gear is preferably carried out as slowly as possible and, when the travel speed is reduced, the reverse shift from the second gear to the first gear is carried out, if possible, only at low speed whereby the shift vibrations are prevented.

FIG. 3:

The rotational speeds of the pump 1 of the first motor 8 and of the second motor 12 are shown on the ordinate. On the abscissa is shown the travel speed or the rotational speed of the output shaft 30. At an origin 56, the pump 1 is at its maximum rotational speed, which is shown by a line 57, and the first motor 8 and the second motor 12 are stationary. Due to the increase of the displacement of the pump 1, the first motor 8 and the second motor 12 accelerate, which is shown by respective lines 58 and 59. At a point 60, the first motor 8 reaches its maximum admissible rotational speed with high pressure load, being adjusted to zero displacement and separated from the high pressure via the valve 9. A line 61 represents the curve of the rotational speed above the maximum admissible rotational speed of the first motor 8, the second motor 12 being also further accelerated by reduction of the displacement. The shift device 23 has in this state engaged the first gear and thus the first reduction gear part 28. At A point 63, the second motor 12 reaches its maximum admissible rotational speed being adjusted to its zero displacement and separated from the high pressure via the valve 13, as can be seen at the point 63. At points 62 and 64 the shift device 23 acts so as to shift to second gear engaging the second reduction gear part 29. The first motor 8 has thus the rotational speed of the point 64 and by reduction of its displacement is further accelerated until reaching its maximum admissible rotational speed at a point 65, and thus the final speed of the vehicle. It is also possible to carry out the shift from first gear to second gear already at the point 60 whereby the rotational speed of the first motor 8 drops to a point 66 whereby, with the two motors, it is possible further to accelerate up to the points 63 and 64. The displacement of the first motor 8, of the second motor 12 and of the ratios of the first gear part 28, of the second gear part 29 and of the third gear part 31 are laid out so that a shift from the first to the second gear is not needed until termination of the working range of the vehicle. When shifting from the first to the second gear, the traction of the vehicle in first gear is below the traction of the vehicle in the second gear so that the vehicle can be further accelerated.

REFERENCE NUMERALS 1 pump
2 common high-pressure line
3 common low-pressure line
4 feed pump
5 pressure feed line 6 tank
7 pressure-medium supply line
8 first motor
9 valve
10 pressure-medium return line
11 pressure-medium supply line
12 second motor
13 valve
14 pressure-medium return line
15 valve
16 valve
17 displacement adjusting device
18 displacement adjusting device
19 proportional valve
20 proportional valve
21 valve
22 actuating device
23 shift device
24 detent
25 line
26 line
27 flushing valve
28 first reduction gear part
29 second reduction gear part
30 output shaft
31 third reduction gear part
32 first spur gear
33 second spur gear
34 first spur gear
35 second spur gear
36 first spur gear
37 second spur gear
38 origin
39 point
40 point
41 line
42 points
43 line
44 point
45 point
46 line
47 point
48 line
49 point
50 point
51 point
52 line
53 point
54 point
56 origin
55 point
57 line
58 line
59 line
60 point
61 line
62 point
63 point
64 point
65 point
66 point
67 radiator
68 line

The invention claimed is:

1. A drive mechanism for a mobile vehicle having first and second radial piston hydraulic motors (8, 12) connectable with a common high-pressure line (2) of a pressure medium source (1), the first hydraulic motor (8) being connected in a first drive range with a first output shaft (30) via a first reduction gear assembly (28) and in a second drive range with the first output shaft (30) via a second reduction gear assembly (29) and the second hydraulic motor (12) being connected with the first output shaft (30) via a third reduction gear assembly (31);
wherein at a maximum rotational speed of the first output shaft (30), one of the first and the second hydraulic motors (8, 12) is adjusted to zero displacement and disconnected from the common high-pressure line (2).

2. The drive mechanism for a mobile vehicle according to claim 1, wherein one shift device (23) connects said first output shaft (30) with one of said first reduction gear assembly (28) or the second reduction gear assembly (29).

3. The drive mechanism for a mobile vehicle according to claim 2, wherein the shift device is a mechanical synchronizer shift device.

4. The drive mechanism for a mobile vehicle according to claim 1, wherein displacement of the first and second hydraulic motors (8, 12) can be adjusted via one adjusting device (17, 18) to a zero displacement and said one adjusting device (17, 18) can be connected with said common high-pressure line (2) and disconnected therefrom.

5. The drive mechanism for a mobile vehicle according to claim 1, wherein the first and second hydraulic motors (8, 12), when separated from the common high-pressure line (2), can be connected with a pressure feed line (5) of a feed pump (4).

6. The drive mechanism for a mobile vehicle according to claim 1, wherein at least one of the first and second hydraulic motors (8, 12) is an internally supported radial piston motor.

7. A drive mechanism for a mobile vehicle having a first and a second hydraulic motor (8, 12) connectable with a common high-pressure line (2) of a pressure medium source (1), the first hydraulic motor (8) being connected in a first drive range with a first output shaft (30) via a first reduction gear assembly (28) and in a second drive range with the first output shaft (30) via a second reduction gear assembly (29) and the second hydraulic motor (12) being connected with the first output shaft (30) via a third reduction gear assembly (31);
wherein at a maximum rotational speed of the first output shaft (30), the second hydraulic motor (12) is adjusted to zero displacement and separated from the common high-pressure line (2), and at least one of the first and second hydraulic motors (8, 12) is an internally supported radial piston motor; and
an adjusting device (17 or 18) of at least said second hydraulic motor (12) is located in a crankshaft thereof.

8. The drive mechanism for a mobile vehicle according to claim 1, wherein said first and second reduction gear assemblies (28, 29, 31) are each a spur gear transmission.

9. The drive mechanism for a mobile vehicle according to claim 1, wherein said first and the second hydraulic motors (8, 9), and the first and the second reduction gears (28, 29, 31) are situated in a common housing which comprises a pressure medium tank (6).

10. The drive mechanism for a mobile vehicle according to claim 1, wherein said drive mechanism is used in a mobile machine, which has a maximum speed of almost 40 km/h and in which no gear shift occurs in a first working range of up to about 20 km/h.

11. The drive mechanism for a mobile vehicle according to claim 1, wherein said first and second hydraulic motors (8, 12) are connected with a lubrication pressure line (68) when separated from said common high-pressure line (2).

12. The drive mechanism for a mobile vehicle according to claim 10, wherein the mobile machine is a wheel loader.

13. A drive mechanism for a mobile vehicle having first and second hydraulic motors (8, 12) connectable with a common high-pressure line (2) of a pressure medium source (1), the first hydraulic motor (8) being shiftably connected, in a first drive range, with a first output shaft (30) via a first reduction gear assembly (28) and, in a second drive range, with the first output shaft (30) via a second reduction gear assembly (29), and the second hydraulic motor (12) being fixedly connected with the first output shaft (30) solely via a direct drive gear assembly (31);

wherein at a maximum rotational speed of the first output shaft (30), one of the first and second hydraulic motors is adjusted to zero displacement and separated from the common high-pressure line (2).

14. The drive mechanism for a mobile vehicle according to claim 13, wherein one shift device (23) connects the first output shaft (30) with one of the first reduction gear assembly (28) and the second reduction gear assembly (29).

15. The drive mechanism for a mobile vehicle according to claim 14, wherein the shift device is a mechanical synchronizer shift device.

16. The drive mechanism for a mobile vehicle according to claim 13, wherein displacement of the first and the second hydraulic motors (8, 12) is adjusted via at least one adjusting device (17 or 18) to a zero displacement and the at least one adjusting device (17, 18) is connected with the common high-pressure line (2) and separated therefrom.

17. The drive mechanism for a mobile vehicle according to claim 13, wherein the first and the second hydraulic motors (8, 12), when separated from the common high-pressure line (2), are connected with a pressure feed line (5) of a feed pump (4).

18. The drive mechanism for a mobile vehicle according to claim 13, wherein the first and second hydraulic motors (8, 9) and the first and the second reduction gears (28, 29, 31) are situated in a common housing which comprises a pressure medium tank (6).

19. The drive mechanism for a mobile vehicle according to claim 13, wherein the drive mechanism is used in a mobile machine which has a maximum speed of about 40 km/h and in which no gear shift occurs in a first working range up to about 20 km/h.

20. The drive mechanism for a mobile vehicle according to claim 13, wherein the first and second hydraulic motors (8, 12) are connected with a lubrication pressure line (68) when separated from the common high-pressure line (2).

* * * * *